Patented Sept. 12, 1944

2,358,250

UNITED STATES PATENT OFFICE 2,358,250

TREATMENT OF CEREALS PRIOR TO FLOUR MILLING

Francis Heron Rogers, Elmhurst, Kenley, and Erich Gustav Huzenlaub, Brentford, England No Drawing. Application January 22, 1941, Serial No. 375,530. In Great Britain January 22, 1940

10 Claims. (Cl. 99—11)

This invention relates to improvements in the treatment of wheat and kindred cereals prior to flour milling and has for its object the processing of grain which is thereafter suitable for milling, and wherein the health sustaining qualities are increased over those available to-day in flours coming under the general category of white flour, household flour or highly milled products.

The process hereinafter set out is equally applicable to cereals intended for consumption without milling, to flour, i. e. for the enrichment of maize grits, semolina, hominy, hulled rice, pearl barley and the like.

When grain is milled for the purpose of making so-called white flour, the husk and bran are removed. The bran includes the embryo and the outer layers of the grain or berry which parts contain the vitamins or vitamin carriers, a portion of the mineral salts, proteins and fatty matters, the whole or parts of which are water soluble and all of which have nutritive value and desirable products in a cereal food.

The researches of Baker, Wright and Drummond show that the minimum of $B_1$ vitamin for an adult per day is 300 international units (I. U.'s) for healthy life, whilst the desirable intake is 600 I. U.'s. In pregnancy three times the normal unit per day are desirable. In cases of toxaemia Theibald (1936) sets this at 1500 units per day.

The survey made of modern diets shows that even with better class diets 500 units per day only is achieved whilst with normal working class diets the B. M. A. bare ration is only 212 I. U.'s whilst the B. M. A. good diet gives only 440 units. Beri-beri becomes a risk at 150 units per day or less (Van Keen 1935 "Tropical Studies").

Whole wheat has 1.2 to 3.1 units of vitamin $B_1$ per gramme. Ordinary roller milled white flour has at a minimum only 0.15, and at a maximum 0.3 international units of $B_1$ vitamin per gramme.

The main reason for deficiency of vitamin $B_1$ in wheat flour has been due to one main cause, viz. the introduction of the roller flour mill. Prior to this the diet of even the very poor was 1000 units per day, and a whole meal flour eating race is hardy and resistant of disease. When wheat is stone ground to about 81% extraction, there are 1.65 international units per gramme as against 0.15 to 0.3 in roller milled flour, and since a 2 lb. loaf of bread contains 594 grammes of flour, the vitamin $B_1$ content in such loaf, the flour of which is roller milled, is only 89 to 187 I. U.'s as against stone milled at an average of 1062 like units. Little further, therefore, need be said for the desirability of returning to the flour the vitamin and soluble salt content now discarded in the bran and offals in the manufacture of white bread from roller mill flour. Vitamin $B_1$ is capable of dialysis (Eijkman 1927) and this physical factor in some measure may account for endosperm absorbency.

Further heating of the cereal in an autoclave above 100° C. tends to cause destruction of the vitamin whilst digestion at or below 100° C. is much less harmful.

Cereal grains such as wheat, barley, rice and many others are very absorbent of moisture and this tendency to absorb moisture is increased by heat or pressure or both. The stage of maximum absorbency appears in most cereals to be between the stage of 18% and 38% moisture content. This absorbency may vary both with the type, age and ripeness of the grain, but a simple series of trial tests on a small scale with dyed water or like testing agents will give, when using a tintometer, a guide as to the best range of penetration.

Equally when grain, having been wetted, is dehydrated or partly dehydrated, strong absorbency is manifest over the same scale of water content. Hence in wetting and then drying grain two useful stages of moisture penetration are traversed. These stages of susceptibility to endosperm penetration are taken advantage of in the invention set out hereafter.

The invention consists in the process of treating grain prior to flour milling to impart to that portion of the grain which is ultimately intended for human consumption or made into flour, or partly milled, a vitamin and soluble salt content largely in excess of that contained in ordinary roller mill flour, or partially milled product, and tending partly to approach the vitamin and salt content of whole grain and which is characterised by steeping the grain with or without prior de-aeration with or without pressure in water at a suitable temperature to obtain vitamin and salt extraction from the germ, and other parts of the grain rich in such matters, of causing such extract to be absorbed by the grain, e. g. by its endosperm at a stage of absorbency, of then withdrawing the residual vitamin and salt extract solution or part thereof, and storing or recycling same, of further processing the grain if required, and of then drying same, and during the process of drying of adding to the said grain by spraying, soaking or otherwise a volume of the vitamin extract, of allowing a period for penetration and of then completing the drying operation to a moisture content as required for milling or storage. The invention includes the steps of making or enriching the extracted vitamin and soluble salt solution from materials other than the grain treated.

According to a modified form of the invention the grain may be partly milled, i. e. the grain may be stripped of its germ and husk or outer layers as by cone milling, and these parts usually termed "offals" then subjected to a warm water steeping process to provide the vitamin and salt extract, said extract being then applied to the body of moist and preferably warm, partly milled grain in a convenient vessel with or without pressure for penetration of the said extract to the endosperm, and in the process of drying said grain, spraying or redamping same with a further volume of said extract.

In treating consecutive batches of grain or offals, the bulk of the steeping water is caused to increase and the surplus is withdrawn to a separate tank and maintained at a temperature of say 40° C. or 60° C., the pH value of the solution being maintained on the acid side of neutral, say pH 5.

In carrying the invention into effect and according to a preferred manner thereof, the wheat or cereal for treatment is first cleaned of dirt and other foreign matter in the usual manner preparatory to milling and is charged into a closable vessel, wherein the contents can be agitated and the vessel then closed. A high vacuum is now created to eliminate imprisoned air in the grains, and without breaking the vacuum, hot or warm water is admitted until the whole of the grain contained in the vessel is submerged. The upper limit of temperature of the water should preferably not exceed 60° C., but it has to be observed that the above temperature may be excessive or not with some grains, and the critical temperature of coagulation or degradation of the albuminous and protein products must be ascertained, and the temperature of the water adjusted accordingly. After the vessel is filled pressure is applied, such as by pumping in air or further water. The pressure should be substantially above atmospheric pressure with a maximum of 100–125 lbs. per square inch under practical conditions. The pressure produced upon the water and the temperature of the water are factors which determine the period during which the pressure treatment is applied. The normal period for treatment, however, with wheat for example, is fifteen to thirty minutes, but this period may be extended if the water is cooler, the period of treatment being to an extent dependent upon the age, quality, size and type of grain. If time be of no consequence and the higher degree of vitamin and salt penetration be not required, pressure or high pressure on the steeping water is unnecessary.

The steeping water becomes enriched by the vitamin and soluble salts extracted from the grain, and as the endosperm swells and becomes absorbent, the vitamin and salt content of the solution enters the endosperm. The steeping water is now withdrawn and used again for treating a further batch or batches, a small amount of fresh water and if required vitamin $B_1$ extract being added to bring the bulk to slightly more than its original volume. The grain in the steeping tank, after withdrawal of the steeping water, is now discharged into a vacuum dryer of any appropriate type, but preferably into a dryer that is steam heated or otherwise. At this stage the grain in a suitable dryer may be further damped by steam and the temperature raised to effect parboiling or conversion but after such treatment vacuum is immediately applied and moisture gradually withdrawn from the grain until a temperature approximately equal to about 40° C. to 60° C. is apparent. The steeping water, which for the purposes of spraying has been stored in a separate tank, and caused to maintain its warmth, is sprayed on to the grain in the dryer at approximately the same temperature as that of the grain mass within the dryer. At this stage the endosperm of the cereal is very absorbent and equally the pericarp and surface layers are both in a receptive state for vitamin penetration. Drying is continued until the required moisture for immediate milling is achieved. This may be placed at say 16%. Milling then proceeds in the ordinary way, but the flour is enriched, and even if roller milled, contains up to 1.2 I. U.'s of vitamin $B_1$ per gramme which on a 2 lb. loaf equals 712.8 international units.

The steeping water may be employed several times and may be filtered to get rid of suspended or other impurities, and ultra filtration may be applied to clarify the solution from vegetable and other matters which tend to discolour the solution, also deodorising and bactericidal agents as, for instance, activated charcoal may be employed. To this solution may be added soluble vitamin or mineral matter or other substances obtained elsewhere, and desirable in the final mill product. Water is added to the solution from time to time, since the volume decreases at each successive treatment of cereal. The added water should be sufficient to provide the additional solvent extraction properties necessary, since there is a point of saturation or discolouration of the solution with salts or other matters, and when this takes place, dilution or replacement may become essential.

Whilst reference is above made to enrichment with particular attention to vitamin $B_1$ the term "vitamin" is intended to include all such as appear in the raw material, and are water soluble, and capable of transfer by absorption in the endosperm.

Owing to the tendency of vitamin $B_1$ or its carriers to be modified or vary its concentration if cuprous or other metals easily forming salts be employed, it is preferable to employ ceramic ware or glass lined vessels within which the vitamin content is extracted and the cereal treated is processed.

With some types of wheat in particular it has been found advisable to enrich the initial steeping water with such quantity of $B_1$ vitamin that a ratio of 1 as to 2 exists between the extracted vitamin $B_1$ and the vitamin added, this step being in some cases necessary in order to obtain a rising concentration of $B_1$ in the steeping water.

When the process is employed for the treatment of partly milled products it is preferable to apply the vitamin enriched solution to the grain prepared in its edible state, i. e. to the white rice, pearl barley, maize grits or semolina, so that the adherent dried layers, part from the absorbed vitamins, are available in the final product.

We claim:

1. A process for enrichment of grain which comprises producing an aqueous extract of enriching material from the group consisting of grain and grain offals and exposing thereto grain having a maximum absorbency when its moisture content ranges substantially between 18% and 38% until the moisture content increases to approximately 38% to introduce enriching material into the endosperm, withdrawing the residual extract, drying the grain to reduce its moisture content to approximately 18%, again exposing the grain to such an extract and permitting the latter to penetrate the endosperm and introduce additional enriching material thereinto until the moisture content has again increased to approximately 38%, and drying the grain to a desired extent.

2. A process for enrichment of grain having a maximum absorbency when its moisture content ranges substantially between 18% and 38% which comprises producing an aqueous extract of enriching material from the group consisting of grain and grain offals and repeatedly exposing the grain to such an extract while the moisture content of the grain is confined substantially within said range of maximum absorbency to impart enriching material to the endosperm of the grain, drying said grain between said exposures to reduce the moisture content of the grain and deposit enriching material in the endosperm, and drying said grain after the last exposure to reduce the moisture content and deposit enriching material in the endosperm.

3. A process for the enrichment of grain having a maximum rate of absorbency when its moisture content ranges substantialzly between 18% and 38%, which comprises steeping the grain in warm water to obtain a solution enriched in vitamins and soluble salts extracted from the grain, said treatment being carried to an extent such that the moisture content of the grain passes substantially through but does not substantially exceed said range, withdrawing the residual solution, drying the grain to deposit said vitamins and soluble salts therein, and during the drying process and only when the moisture content of the grain is within said range, redamping the grain with the enriched solution and then completing the drying operation.

4. A process for enrichment of grain which comprises producing an aqueous extract of enriching material from the group consisting of grain and grain offals and exposing thereto grain having a maximum absorbency when its moisture content ranges substantially between 18% and 38% until the moisture content increases to an amount substantially exceeding 18% to introduce enriching material into the endosperm, withdrawing the residual extract before the moisture content of the grain substantially exceeds 38%, drying the grain to reduce its moisture content and deposit said enriching material in the endosperm, again exposing the grain to such an extract and permitting the latter to penetrate the endosperm and introduce additional enriching material thereinto while the moisture content of the grain is substantially confined to said range, and drying the grain.

5. A process for enrichment of grain as set forth in claim 4 wherein the aqueous extract of enriching material used to treat one batch of grain is reused to treat succeeding batches of grain.

6. A process for enrichment of grain as set forth in claim 4 wherein the aqueous extract of enriching material is produced by steeping whole grain in water.

7. A process for enrichment of grain as set forth in claim 4 wherein the grain is first partially milled and the aqueous extract of enriching material is prepared from grain offals.

8. A process for enrichment of grain as set forth in claim 4 and as applied to wheat, wherein the initial exposure of the grain to the aqueous extract of enriching material is carried out at a temperature not in excess of 60° C. and for a period not exceeding 30 minutes.

9. A process for enrichment of grain as set forth in claim 4 wherein the aqueous extract of enriching material is filtered, brought to a desired enrichment value, and reused.

10. A process for enrichment of grain as set forth in claim 4 wherein the second exposure of the grain to the aqueous extract of enriching material takes place immediately after the first drying step.

FRANCIS HERON ROGERS.
ERICH GUSTAV HUZENLAUB.